May 19, 1964

H. PHILLIPS ETAL 3,133,802

VAPOR PURIFICATION AND DRYING APPARATUS

Filed Oct. 10, 1961

INVENTORS
HENRY PHILLIPS
JOHN W. RACKIS
BY

ATTORNEY

May 19, 1964

H. PHILLIPS ETAL 3,133,802

VAPOR PURIFICATION AND DRYING APPARATUS

Filed Oct. 10, 1961

INVENTORS
HENRY PHILLIPS
JOHN W. RACKIS
BY
Richard H. Thomas
ATTORNEY

United States Patent Office 3,133,802
Patented May 19, 1964

3,133,802
VAPOR PURIFICATION AND DRYING
APPARATUS
Henry Phillips, Metuchen, N.J., and John W. Rackis, Staten Island, N.Y., assignors to Foster Wheeler Corporation, New York, N.Y., a corporation of New York
Filed Oct. 10, 1961, Ser. No. 144,119
11 Claims. (Cl. 55—483)

The present invention relates to a means for vapor purification and drying, and in particular, to an improved separating and drying means for removing entrained liquid, foam, and sludge from a vapor-liquid mixture.

The vapor-liquid mixture produced in a boiler or generator and delivered to a collection chamber is comprised generally of a homogeneous mixture of vapor, foam and sludge, and as much as possible of the liquid and solid impurities must be eliminated from the vapor before it is suitable for superheating or use. For instance, the relatively large masses of liquid must be removed from the vapor, and the vapor must be reduced to the dryness required in specifications on the boiler or generator.

Many varieties of vapor-liquid separators have been used, including various arrangements of dryer screens and bent plates. In these conventional or prior arrangements, it has been impossible to do more than approach an ideal design. For instance, although a greater amount of water is separated for a given separator surface with a higher velocity flow of the vapor-liquid mixture through the separator, such increased velocity creates an adverse affect on the drainage of liquid from the separator forcing designers to comprise.

A further disadvantage with many conventional separators is the danger of having overloading of a particular section of the separator and, as a result, a reduced efficiency in the separator. Overloading is a condition which exists when the rate of separation exceeds the rate at which the separated moisture drains by gravity.

Accordingly, it is an object of the present invention to provide an improved vapor-liquid purifying and drying arrangement which achieves an efficient first or primary separation, and an improved final separation or drying, at maximum velocity flow and with minimum pressure drop in the stages of separation. More specific objects are to avoid in the stages of separation drain-back of liquid against the vapor mixture flow, and efficient distribution of flow across the separators without overloading sections thereof. A further object of the invention is to accomplish the desired results with a minimum utilization of boiler space.

Essentially, the purification and drying apparatus of the invention comprises two superimposed wire mesh assemblies acting in series, the upper mesh assembly including a plurality of parallel, elongated, wire mesh sections adapted to be disposed wholly within and across a vapor space of a vessel having a liquid and a vapor space. The plurality of mesh sections extend, in one direction longitudinal to the sections completely across the vessel, but in a transverse direction, a multiple number of the sections are used and disposed so that the edges of the sections abut each other to cover the vapor space. Successive sections in said transverse direction are inclined relative to the horizontal and to each other to provide a chevron shaped pattern across the vapor space and at the lowermost junctions of adjacent sections, troughs are positioned to collect liquid flowing from the mesh sections. Drain or downflow pipes are provided leading from the troughs to convey the liquid back to the liquid space. The second or lower mesh assembly is disposed below the above-mentioned assembly and is comprised of a single continuous annular vertically extending, mesh section or a plurality of vertically extending mesh sections spaced inwardly from the inner surface of the vessel encompassing and defining a vertically extending flow passageway leading to the underside of the upper mesh assembly. Sealing plates or baffling means are provided for sealing the lower mesh sections with the walls of the vessel and with each other in a manner whereby the vapor-liquid mixture is constrained to flow in a transverse direction through the vertically extending sections and upwardly through the upper mesh assembly. Means are provided for collecting the liquid flow from the vertically extending mesh sections and conveying the liquid to the liquid space of the vapor generator.

Preferably, the mesh sections are composed of layers of woven wire mesh held together by a grid support. Other foraminous elements may, however, be used.

It will be apparent that the arrangement of the upper mesh assembly prevents a drain-back of liquid against the flow of vapor, as well as a maximum surface area for contact with the vapor, whereas the lower mesh assembly, while still avoiding drain-back of liquid against the vapor flow, provides an initial separation and optimum distribution of the vapor-liquid mixture across the upper mesh assembly.

In one embodiment of the invention, wherein a plurality of annular vertically disposed lower mesh sections are used, the sections are preferably cylindrical in shape and concentric with each other, and are suitably sealed or baffled, to provide optimum distribution of the vapor-liquid mixture across the upper assembly. This embodiment is useful in larger installations.

A better understanding of the invention and the advantages thereof will become apparent upon consideration of the following specification and the accompanying drawings, in which.

Figure 1:
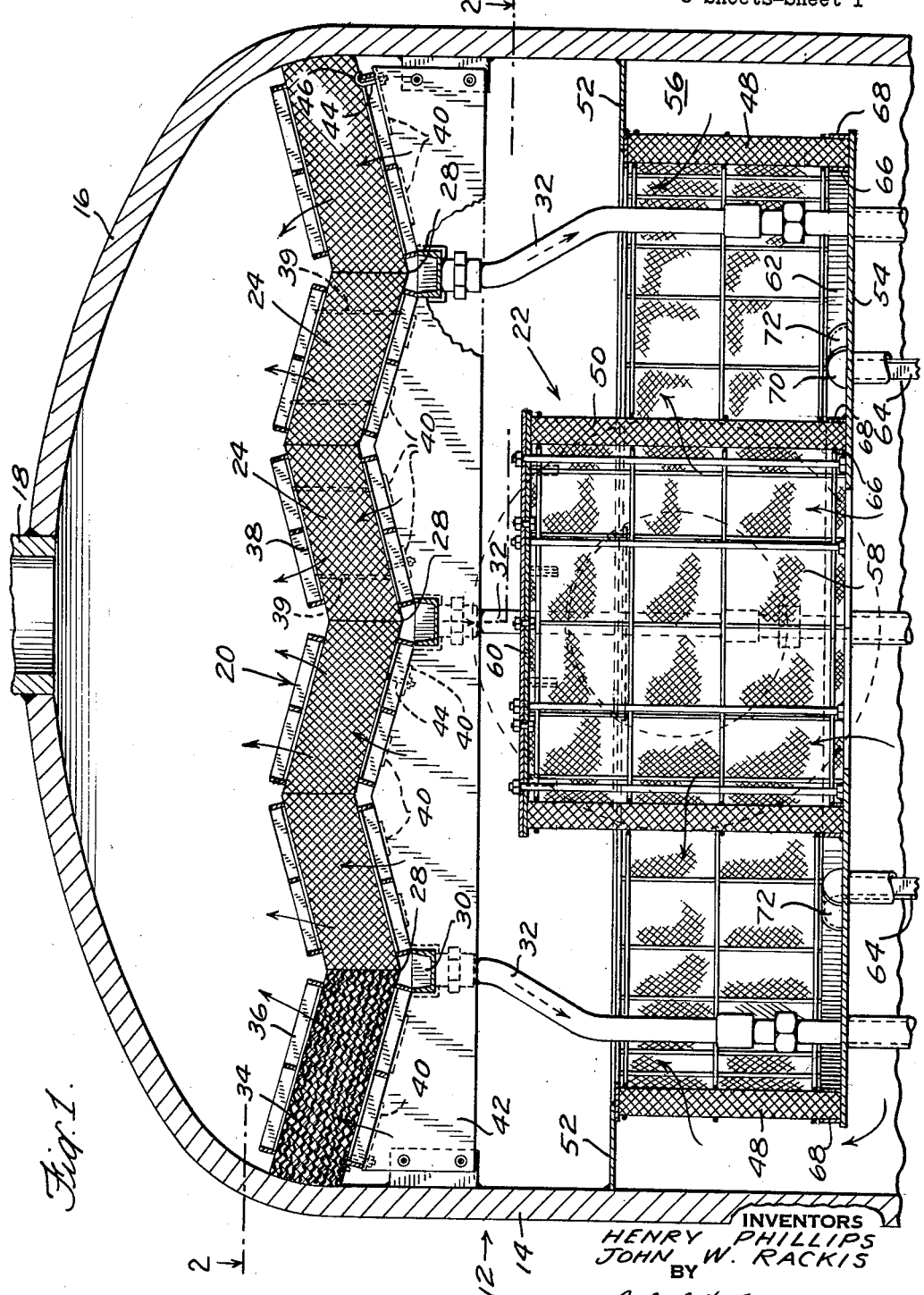
FIGURE 1 is a vertical sectional view of a portion of a vapor generator and of a liquid-vapor purification and drying means according to the invention.

Referring to FIG. 1, a vapor generating unit 12, with which the purification and drying means of the invention might be used, is illustrated, comprising a cylindrical, vertically oriented, elongated pressure vessel 14 having an upper hemispherical head 16 at one end thereof. A vapor outlet 18 is located in the head 16.

During normal operation of the vapor-generating unit a liquid level is formed which divides the vessel into an upper vapor space and a lower liquid space, and a vapor generating means (not shown) is disposed within the liquid space communicating with a fluid inlet by which feed liquid is introduced into the vessel. The vapor space which extends upwardly into the upper portion of the vessel above the generating unit and liquid space is provided with the vapor purification and drying arrangement which constitutes the present invention.

The vapor purification and drying means is comprised of two portions, an upper mesh assembly 20 and a lower mesh assembly 22, the upper assembly 20, having a plurality of narrow rectangular, elongated, box-shaped wire mesh sections 24. The mesh sections, numbering six (6) in this instance, are arranged parallel to each other and are long enough to extend in one direction across the vapor space between the walls of the vessel, and in another direction transverse to said one direction, the sections are made contiguous to each other or are brought into abutting relationship. As illustrated in FIG. 1, the flat mesh sections 24 in said transverse direction are inclined relative to the horizontal, and successive mesh sections are inclined in opposite directions to provide a chevron shaped pattern across the vapor space. At the lowermost junctions 28 of adjacent sections, troughs 30 are positioned to collect liquid flowing from the sections, and drain pipes or downflow pipes 32 are provided leading from the troughs to convey liquid back to the liquid space of the vessel.

The mesh sections are preferably inclined at an angle of about 15° with the horizontal for optimum efficiency, but other angles may be suitable. The 15° angle seems to offer optimum distribution of vapor across the sections with maximum flow of separated liquid to the troughs and downcomers.

Figure 2:
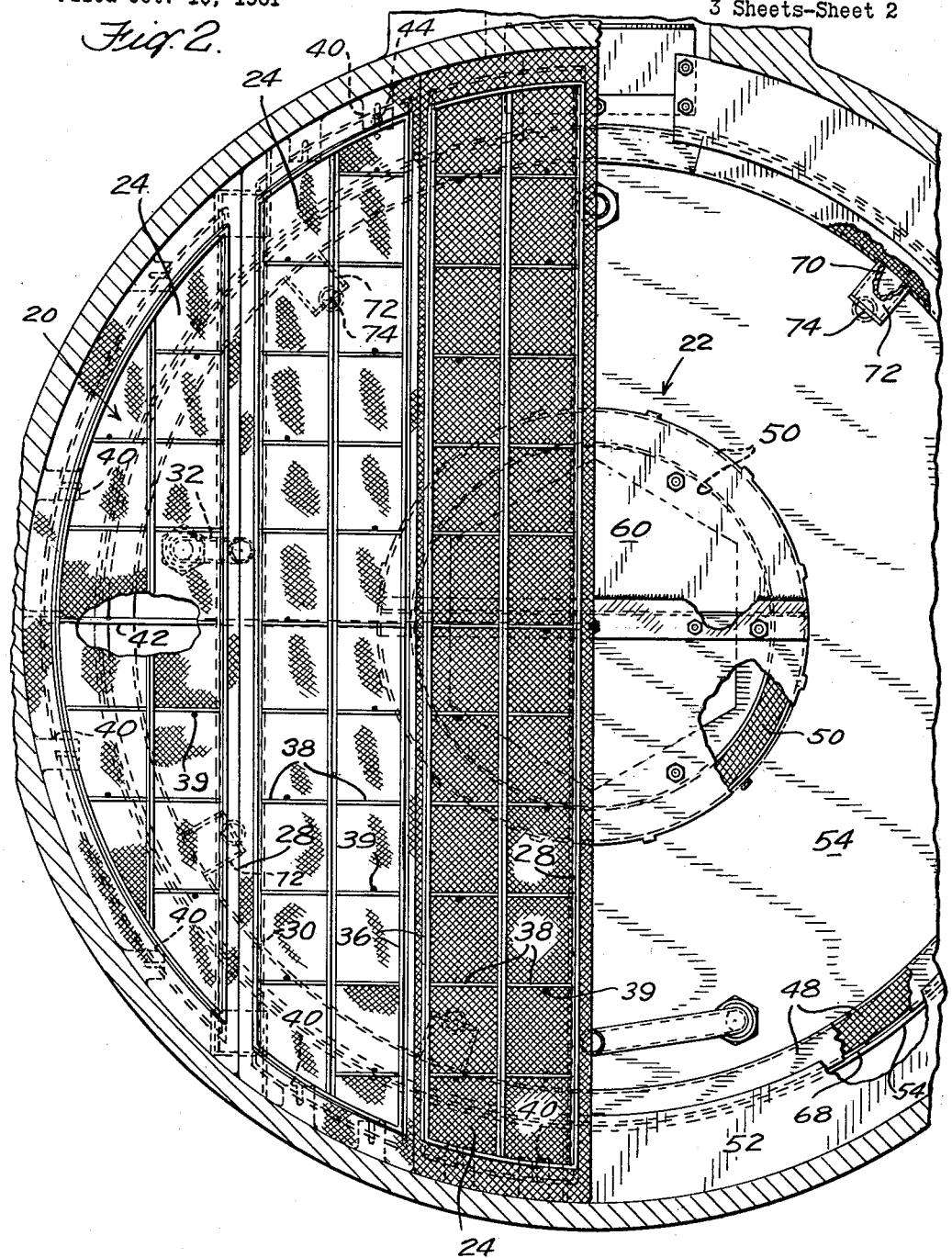
FIGURE 2 is a plan sectional view taken along line 2—2 of FIG. 1.

Each of the mesh sections is comprised of a plurality of layers 34 (FIG. 1) of woven wire mesh held together by a grid network having plate members 36, FIGS. 1 and 2, extending around the edges of the section and grid rods 38 extending between the plate members, to form upper and lower ladder networks or grids across the top and bottom of the layers of woven wire mesh. Metal straps 39 extend through the layers of mesh holding the upper and lower grids together and forming the compact elongated mesh sections.

Figure 4:
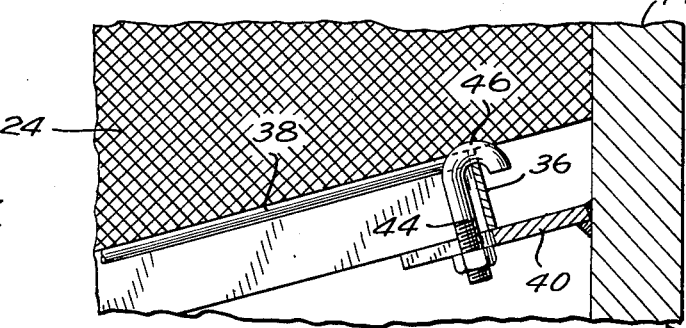
FIGURE 4 is an enlarged elevation view of support means for the liquid-vapor purification and drying means of the invention.

The sections are supported by lugs 40 fastened to the walls of the vessel and by a channel member 42 (FIG. 1) also fastened to the vessel and extending beneath the sections in a direction transverse to the longitudinal axis thereof. Jay (J) bolts 44, shown in detail in FIG. 4, may be used to hold the sections 24 to the lugs 40, the upper legs 46 of the bolts passing upwardly and over the plate members 36 of the grid network.

The lower mesh assembly is comprised of an outer, vertically oriented, annular or cylindrical section 48 (FIGS. 1 and 2) and an inner annular or cylindrical section 50, also vertically oriented, concentric with the outer section. Two annular washer-like sealing plates 52 and 54 are disposed between the outer section and the vessel, and between the inner and outer sections, respectively, to define outer and inner vertically extending passageways 56 and 58, FIG. 1. A third sealing plate 60 is used so that the vapor-liquid mixture flowing into passageway 58 is constrained to flow transversely through inner mesh section 50. Similarly, the vapor-liquid mixture flowing upwardly in passageway 56 is constrained to flow through outer mesh section 48. By extending the inner mesh section 50 closer to the upper mesh assembly than the outer mesh section 48, the surface area for the two mesh sections is made approximately equal resulting in an improved distribution of flow across the upper mesh assembly.

On the surface of plate 54, means 62 are provided for collecting the liquid draining from the mesh sections 48 and 50 and conveying the liquid to drain pipes 64.

Essentially, the collecting means comprises annular plates 66 and 68 fastened to and covering the inner and outer bottom surfaces respectively, of the mesh sections 48 and 50, and defining with the sealing plate 54 circular channels or troughs into which water from the mesh sections drains. With respect to the outer section 48, the inner plate 66 is provided with a plurality of cut-out portions 70 which are in fluid communication with tunnels 72, FIG. 2, leading to openings 74 in the sealing plate 54. A drain pipe 64 is associated with each opening. The tunnels 72 are adapted to direct the water which is collected between annular plates 66 and 68 to the openings 74 but also are arranged to cover only a portion of the openings to permit any water collected on the top of the sealing plate 54 to flow through the openings.

It is apparent from FIGS. 1 and 2 that the present invention provides an improved vapor-liquid separating and drying apparatus by which drain-back of liquid against the vapor flow is avoided. Instead of flowing counter to the vapor flow, the separated liquid flows at an angle to the vapor flow and into troughs where it is collected for return to the liquid space of the pressure vessel. The invention thereby permits a higher velocity flow through the mesh sections resulting in an improved separation and drying of the vapor for a given surface area. Further, the arrangement provides a means by which a maximum surface area of contact for the vapor is obtained requiring a minimum amount of space in the vessel and further by which an optimum distribution of flow across the mesh sections are obtained preventing overloading of any one section.

Figure 3:
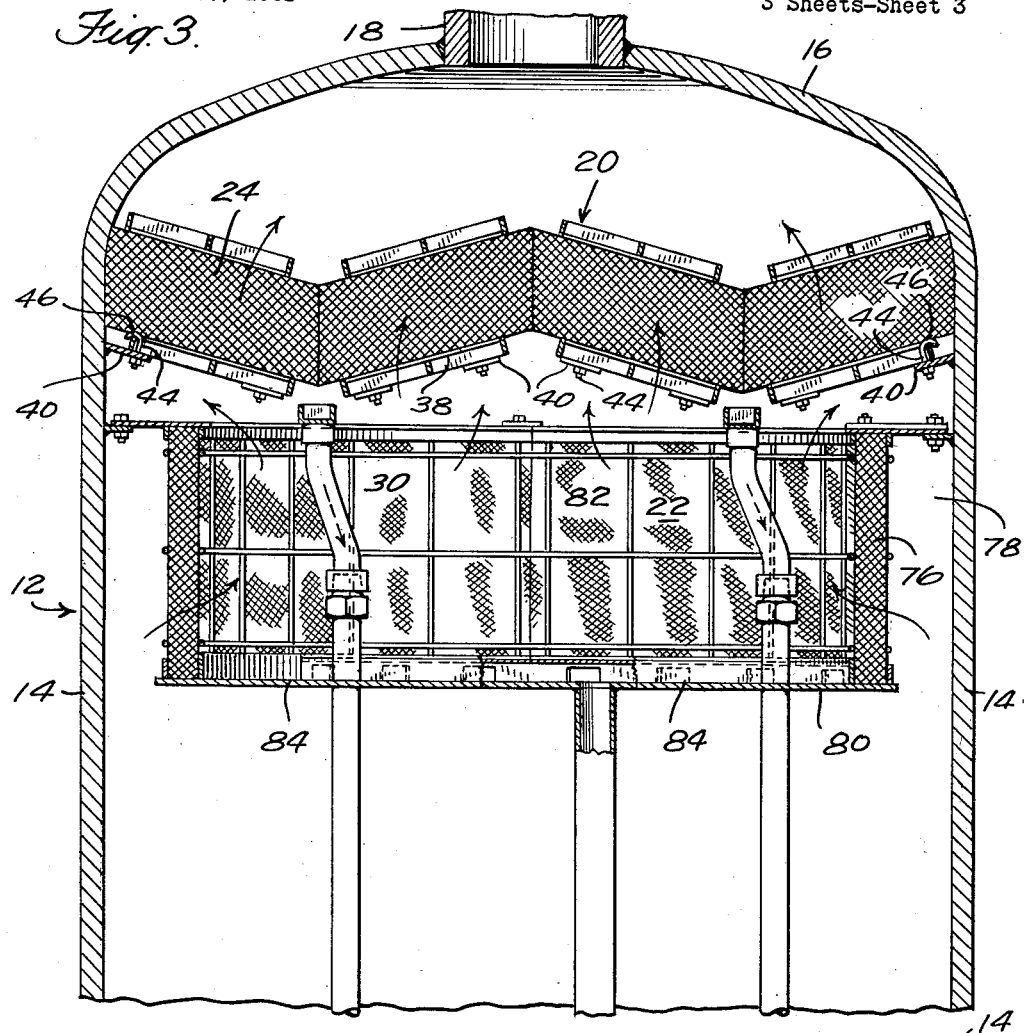
FIGURE 3 is a vertical sectional view of a modification of the vapor-liquid purification and drying means of the invention.

Referring to FIG. 3, there is illustrated an embodiment of the invention for pressure vessels of smaller diameter. In the arrangement illustrated, there is provided a single, cylindrical lower mesh section 76 defining with the pressure vessel an annular passageway 78 for the flow of vapor and liquid. The seal plate 80 is a circular plate disposed beneath the mesh section in a manner whereby the vapor-liquid mixture is constrained to flow across the vertical exposure of the mesh section into the vertically extending passageway 82 defined by the mesh section and leading to the under side of the upper mesh assembly 20. A trough means 84 into which the lower mesh section is seated is again provided for the flow of liquid to the liquid space of the vessel.

Although the invention has been described with reference to specific structure, many modifications will be apparent to those skilled in the art. For instance, the lower mesh section may take a shape other than cylindrical. Under certain conditions an advantageous flow distribution may be obtained by a conical or even spherical surface of revolution. Accordingly, the invention is to be limited only as defined in the following claims.

What is claimed is:

1. In a vessel having a vapor space, outlet means from said vapor space, inlet means spaced from said outlet means to introduce a vapor and liquid mixture to said vapor space; a vapor-liquid separating and drying apparatus between said inlet and outlet means comprising an upper second stage separation means including a plurality of elongated foraminous sections extending in their longitudinal direction across the vapor space, said sections in their transverse direction being contiguous with each other and inclined relative to the horizontal and to each other to provide a chevron shaped pattern across the chamber; trough means disposed beneath lowermost portions of said sections, drain means connected to said trough means to convey liquid from said vapor space; and a lower first stage separation means below and spaced from said upper second stage separation means but intermediate said inlet and outlet means comprising a foraminous mesh enclosure encompassing and defining a vertically extending flow passageway, means baffling said enclosure within said vapor space to obtain a transverse vapor-liquid flow through said enclosure to said passageway whereby the liquid content in the flow is reduced to moisture in the form of fine vapor-born spray.

2. A vapor-liquid separating and drying apparatus comprising a vertically oriented vessel defining a vapor-liquid collection chamber; outlet means from said chamber; inlet means to said chamber spaced from said outlet means to introduce a vapor and liquid mixture into the chamber; an upper mesh second stage separation means between said inlet and outlet means comprising a plurality of narrow elongated wire mesh sections extending in their longitudinal direction across the chamber and being contiguous with each other in a transverse direction to substantially cover said chamber, successive sections in said transverse direction being inclined relative to the horizontal and to each other to provide a chevron shaped pattern across the chamber; trough means disposed beneath contiguous lower-most portions of said sections to collect water flowing from said sections; drain means connected to said trough, means to convey liquid from said chamber; and a lower mesh first stage separation means intermediate said inlet and outlet means disposed beneath said upper mesh second stage separation means and spaced therefrom and from said vessel comprising a mesh enclosure encompassing and defining a vertically extending flow passageway, means baffling said enclosure within said vessel to obtain a transverse vapor-liquid flow through said enclosure to said passageway whereby the liquid content in the flow is reduced to moisture in the form of fine vapor-born spray.

3. A vapor-liquid separating and drying apparatus according to claim 2 further including trough means into which said mesh enclosure is seated to collect liquid flowing from said enclosure and drain means to convey liquid so collected from said chamber.

4. A vapor-liquid separating and drying apparatus comprising a vertically oriented vessel defining a vapor-liquid collection chamber; outlet means from said chamber; inlet means spaced from said outlet means arranged to introduce a vapor and liquid mixture into said chamber; and upper mesh second stage separation means between said inlet and outlet means comprising a plurality of narrow elongated wire mesh sections extending in their longitudinal direction across the chamber and being contiguous with each other in a transverse direction to substantially cover said chamber, successive sections in said transverse direction being inclined relative to the horizontal and to each other to provide a chevron shaped pattern across the chamber; trough means disposed beneath contiguous lower-most portions of said sections to collect water flowing from said sections; drain means connected to said trough means to convey liquid from said chamber; and a lower mesh first stage separation means between said inlet and outlet means disposed beneath said upper mesh second stage separation means and spaced therefrom and from said vessel comprising a continuous upright two-dimensional mesh enclosure defining an inner vertically extending flow passageway, means baffling said enclosure within said vessel to obtain a transverse vapor-liquid flow through said enclosure to said passageway whereby the liquid content in the flow is reduced to moisture in the form of fine vapor-born spray.

5. A vapor-liquid separating and drying apparatus comprising a vertically oriented vessel defining a vapor-liquid collection chamber; outlet means from said chamber; inlet means spaced from said outlet means arranged to introduce a vapor and liquid mixture into said chamber; an upper mesh second stage separation means between said inlet and outlet means comprising a plurality of narrow elongated wire mesh sections extending in their longitudinal direction across the chamber and being contiguous with each other in a transverse direction to substantially cover said chamber, successive sections in said transverse direction being inclined relative to the horizontal and to each other to provide a chevron shaped pattern across the chamber; trough means disposed beneath contiguous lower-most portions of said sections to collect water flowing from said sections; drain means connected to said trough means to convey liquid from said chamber; and a lower mesh first stage separation means between said inlet and outlet means disposed beneath said upper mesh second stage separation means and spaced therefrom and from said vessel comprising a continuous mesh section defining an upright surface of revolution, said surface of revolution in turn defining an inner vertically extending flow passageway, means baffling said enclosure within said vessel to obtain a transverse vapor-liquid flow through said enclosure to said passageway whereby the liquid content in the flow is reduced to moisture in the form of fine vapor-born spray.

6. A vapor-liquid separating and drying apparatus comprising a vertically oriented vessel defining a vapor-liquid collection chamber; outlet means from said chamber, inlet means spaced from said outlet means arranged to introduce a vapor and liquid mixture to said chamber; an upper mesh second stage separation means between said inlet and outlet means comprising a plurality of narrow elongated wire mesh sections extending in their longitudinal direction across the chamber and being contiguous with each other in a transverse direction to substantially cover said chamber, successive sections in said transverse direction being inclined relative to the horizontal and to each other to provide a chevron shaped pattern across the chamber; trough means disposed beneath contiguous lower-most portions of said sections to collect water flowing from said sections; drain means connected to said trough means to convey liquid from said chamber; and a lower mesh first stage separation means between said inlet and outlet means disposed beneath said upper mesh second stage separation means and spaced therefrom and from said vessel comprising a cylindrical mesh section defining an inner vertically extending flow passageway, said assembly having a closure plate across the bottom of the passageway and sealing means between the vessel and the upper edge of the mesh section to obtain a transverse vapor-liquid flow through said mesh section to said passageway whereby the liquid content in the flow is reduced to moisture in the form of fine vapor-born spray.

7. A vapor-liquid separating and drying apparatus comprising a vertically oriented vessel defining a vapor-liquid collection chamber; outlet means from said chamber; inlet means spaced from said outlet means arranged to introduce a vapor and liquid mixture to said chamber; an upper mesh second stage separation means between said inlet and outlet means comprising a plurality of narrow elongated wire mesh sections extending in their longitudinal direction across the chamber and being contiguous with each other in a transverse direction to substantially cover said chamber, successive sections in said transverse direction being inclined relative to the horizontal and to each other to provide a chevron shaped pattern across the chamber; trough means disposed beneath contiguous lowermost portions of said sections to collect water flowing from said sections; drain means connected to said trough means to convey liquid from said chamber; and a lower mesh first stage separation means between said inlet and outlet means disposed beneath said upper mesh second stage separation means and spaced therefrom and from said vessel comprising concentric inner and outer mesh enclosures defining therebetween an annular vertically extending flow passageway, means baffling said enclosures within said vessel to obtain a transverse vapor-liquid flow through said enclosures to said passageway whereby the liquid content in the flow is reduced to moisture in the form of fine vapor-born spray.

8. A vapor-liquid separating and drying apparatus according to claim 7 wherein said inner mesh enclosure extends upwardly closer to said upper mesh assembly than said outer mesh enclosure.

9. A vapor-liquid separating and drying apparatus comprising a vertically oriented vessel defining a vapor-liquid collection chamber; outlet means from said chamber; inlet means spaced from said outlet means arranged to introduce a vapor and liquid mixture to said chamber; an upper mesh second stage separation means between said inlet and outlet means comprising a plurality of narrow elongated wire mesh sections extending in their longitudinal direction across the chamber and being contiguous with each other in a transverse direction to substantially cover said chamber, successive sections in said transverse direction being inclined relative to the horizontal and to each other to provide a chevron shaped pattern across the chamber; trough means disposed beneath contiguous lowermost portions of said sections to collect water flowing from said sections; drain means connected to said trough means to convey liquid from said chamber; and a lower mesh first stage separation means between said inlet and outlet means disposed beneath said upper mesh second stage separation means and spaced therefrom and from said vessel comprising concentric cylindrical inner and outer mesh sections defining therebetween an annular vertically extending flow passageway, said assembly having an annular closure plate across the bottom of the passageway and sealing means between the vessel and the upper edge of the outer mesh section and across the top of the inner mesh section to obtain a transverse vapor-liquid flow through said mesh sections to said passageway whereby the liquid content in the flow is reduced to moisture in the form of fine vapor-born spray.

10. A vapor-liquid separating and drying apparatus comprising a vertically oriented vessel defining a vapor-liquid collection chamber; outlet means from said chamber; inlet means spaced from said outlet means arranged to introduce a vapor and liquid mixture to said chamber; and upper mesh second stage separation means between said inlet and outlet means comprising a plurality of narrow, elongated rectangular wire mesh sections extending in their longitudinal direction across said chamber and being disposed in a transverse direction in abutting relationship to cover said chamber, successive sections in said transverse direction being inclined relative to the horizontal and to each other to provide a chevron shaped pattern across the chamber; trough means disposed beneath abutting lowermost portions of said sections to collect water flowing from said sections; drain means connected to said trough means to convey liquid from said chamber; and a lower mesh first stage separation means between said inlet and outlet means disposed beneath said upper mesh second stage separation means and spaced therefrom and from said vessel comprising a mesh enclosure encompassing and defining a vertically extending flow passageway, means baffling said enclosure within said vessel to obtain a transverse vapor-liquid flow through said enclosure to said passageway whereby the liquid content in the flow is reduced to moisture in the form of fine vapor-born spray.

11. A vapor-liquid separating and drying apparatus according to claim 10 wherein said elongated rectangular wire mesh sections are inclined at about 15° relative to the horizontal.

References Cited in the file of this patent
UNITED STATES PATENTS

| | | |
|---|---|---|
| 1,761,169 | Andrews | June 3, 1930 |
| 2,199,632 | Keyes | May 7, 1940 |
| 2,485,767 | Patterson | Oct. 25, 1949 |
| 2,970,671 | Warner | Feb. 7, 1961 |